(12) United States Patent
Ignatyev

(10) Patent No.: US 10,430,859 B2
(45) Date of Patent: Oct. 1, 2019

(54) SYSTEM AND METHOD OF GENERATING A RECOMMENDATION OF A PRODUCT OR SERVICE BASED ON INFERRING A DEMOGRAPHIC CHARACTERISTIC OF A CUSTOMER

(71) Applicant: NETSUITE INC., San Mateo, CA (US)

(72) Inventor: Oleksiy Ignatyev, Belmont, CA (US)

(73) Assignee: NETSUITE INC., San Mateo, CA (US)

( * ) Notice: Subject to any disclaimer, the term of this patent is extended or adjusted under 35 U.S.C. 154(b) by 815 days.

(21) Appl. No.: 15/080,055

(22) Filed: Mar. 24, 2016

(65) Prior Publication Data

US 2017/0236182 A1    Aug. 17, 2017

Related U.S. Application Data

(60) Provisional application No. 62/139,927, filed on Mar. 30, 2015.

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC ................................. G06Q 30/06–08
USPC ................................ 705/26.1–27.2
See application file for complete search history.

(56) References Cited

U.S. PATENT DOCUMENTS

| | | | |
|---|---|---|---|
| 6,697,824 B1 * | 2/2004 | Bowman-Amuah | G06F 16/958 709/229 |
| 9,817,991 B2 | 11/2017 | Boncha et al. | |
| 9,892,467 B2 | 2/2018 | Shak et al. | |
| 2010/0114663 A1 * | 5/2010 | Casas | G06Q 10/067 705/7.31 |
| 2017/0236152 A1 | 8/2017 | Dimaunahan et al. | |
| 2017/0236160 A1 | 8/2017 | Oberoi et al. | |

\* cited by examiner

*Primary Examiner* — Ethan D Civan
(74) *Attorney, Agent, or Firm* — Kraguljac Law Group, LLC

(57) ABSTRACT

Systems, apparatuses, and methods for determining one or more demographic characteristics of a user/customer, and then using such information to generate a recommendation of a product or service for the user/customer. In some embodiments, a customer's first and/or last name as obtained from a single transaction may be used to infer their nationality or ethnicity with a certain probability of being correct. This demographic information may then be used to identify one or more products or services that are expected to be of interest.

16 Claims, 6 Drawing Sheets

SYSTEM AND METHOD OF GENERATING A RECOMMENDATION OF A PRODUCT OR SERVICE BASED ON INFERRING A DEMOGRAPHIC CHARACTERISTIC OF A CUSTOMER

CROSS REFERENCE TO RELATED APPLICATION

This application claims priority from U.S. provisional patent application No. 62/139,927, entitled System and Method for Estimating Demographic Characteristics of Customers for Use in Generating Recommendations," filed Mar. 30, 2015, which is incorporated by reference herein in its entirety (including the Appendix) for all purposes.

BACKGROUND

Customer relations or customer service is an important part of the relationship between a business and existing or potential customers. Such service may include providing information about products and services in which the customer has shown an interest. However, an important part of operating a business is also helping to identify products that may be of interest to a particular customer. Thus customer relations/service may include helping customers to find items that were previously unknown to them but that are believed to be of possible interest. This type of recommendation or a similar service enables a business' employees (such as salespersons) to develop a closer relationship with customers or prospective customers, thereby helping to increase the likelihood that the customer will be satisfied with a purchase. In addition, such services assist the business by improving sales and generating goodwill with customers.

In general, communications between a salesperson and a customer or potential customer are an important part of how a business develops relationships with the public. Many businesses rely on such communications to market products or services, to develop a deeper relationship with existing customers, to develop potential customers into actual customers, and ultimately to increase sales and improve customer retention. In some situations, such communications can serve as part of a larger customer service strategy for a business and assist in delivering a highly personalized experience to a customer or prospective customer. Typically, such communications may be verbal (via phone or in person) or written and delivered using one of several possible delivery methods (e.g., email, text messaging, or printed materials delivered via regular mail).

As mentioned, one aspect of personalized or customized customer services and communications is that of providing a customer or prospective customer with a "recommendation" or "suggestion" as to a product or service that may be of interest to them. The recommendation or suggestion may be based on a salesperson's observations of which items a customer looks at, picks up, tries on in a changing room, etc. While this can be useful and effective in some instances, it is imprecise unless there is a reason to believe that the particular salesperson is somehow very adept at selecting or recommending items for that specific customer. This potential problem can be overcome by using a "personal shopper" or equivalent form of "expert", but such assistance is typically not available to the casual or less frequent shopper. Most businesses will only offer a personal shopper to those customers who spend a relatively large amount of money on their products or whose use of the products provides the business with intangible benefits (such as increased brand recognition, valuable publicity, etc.). This means that the customer who spends less or whose use of the products does not provide other benefits to the business may be unable to receive the advice of a personal shopper, stylist, or other form of "expert" who might be best able to recommend a product of interest to the customer.

This situation has generated interest in developing effective ways of making recommendations for customers, where the effectiveness may be measured by a conversion rate or other metric that measures how successful an approach was at causing a customer to make a purchase of the recommended item. Conventional approaches to generating a recommendation are typically based on "mining" transaction data for the customer and/or for a class of which the customer is known to (or expected to) share one or more characteristics, where those characteristics are thought to be relevant to selecting an item or items to recommend.

As an example, statistical analysis, machine learning (supervised or unsupervised), or other analytical methods may be used alone or in combination to identify one or more relevant characteristics that the purchasers of an item share. Then data mining can be used to determine a set of items that are typically purchased by members of the group of purchasers. Based on that, a recommendation can be made to a customer who purchased one of the items in the set of items typically (or preferentially) purchased by the group based on collaborative filtering, with the recommendation being to purchase another item in the set. In this example, by having certain shared characteristics with the other members of the group, the customer is assumed to have similar product interests. This assumption may be correct or may be in error, but in many cases, it is the best that can be done without knowing more about the relationship between a person's demographic characteristics and their purchasing preferences. Unfortunately, this approach to generating a recommendation may require a significant amount of transaction data (either from the object of the recommendation or from multiple persons) in order to validate any particular model or assumptions.

Another problem in generating product recommendations arises because many customers shop on-line using an eCommerce web store and the data available about their on-line purchases may be limited. In such a situation, it would be advantageous to be able to generate recommendations based on more than simply the on-line purchases and the information about customer preferences that can be extracted from a limited set of transactions, which in some cases may be all that is available. Further, in some cases a business would like to be able to present a recommendation to a customer or prospective customer relatively early in the customer/vendor relationship and not have to wait until sufficient transaction based data is collected to use in a particular model or algorithm.

One conventional approach to providing a solution to the problem of not being able to have sufficient demographic information to generate a reliable recommendation is based on identifying the IP address corresponding to one or more eCommerce customers. Based on this information, a general geographical location of an identified IP address is linked to aggregated demographics. While a useful solution in theory, the granularity and accuracy of this approach is often poor and the result is therefore too uncertain to rely upon. For example, the IP address could be linked to the location of a city, such as 'San Francisco', and then an aggregate demographics profile of San Francisco could be associated with a specific eCommerce customer based on the IP address.

However, given the large variety of people living in San Francisco, an aggregation of all of their demographic profiles does not provide a sufficiently accurate characterization of a specific eCommerce customer.

As noted, in a general sense it is known that there are characteristics of customers that are such that if customers have certain of these characteristics, they will be more likely to have an interest in certain products or in a certain set of products. For example, those who vacation in an area where skiing is popular may be more interested in winter clothing. Among others, such characteristics may include age range, income range, education, religious affiliation, ethnicity, nationality, etc. Since some products or services are directed at specific groups, affiliations, or ethnicities (such as foods, makeup, hair products, books, records, movies, etc.), being able to infer that a relatively new purchaser is a member of (or shares something in common with members of) such groups, affiliations, or ethnicities may be helpful in generating more effective recommendations.

While useful and sometimes sufficiently accurate, conventional approaches to generating product recommendations are inherently limited as they typically rely heavily on a set of transactions and the related data. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for determining one or more demographic characteristics of a user/customer, and then using such information to generate a recommendation of a product or service for the user/customer. In some embodiments, a customer's first and/or last name may be used to infer their nationality or ethnicity with a certain probability of being correct. This demographic information may then be used to identify one or more products or services that are expected to be of interest. In some embodiments, a customer's IP address may be used to determine a relative location of the customer's residence, and in combination with census data, may be used to infer the customer's nationality or ethnicity with a certain probability of being correct.

In some embodiments, the inferred demographic characteristic(s) may enable generating a recommendation that is more likely to be of interest to the user/customer than it would be to those not sharing that characteristic (such as specialty foods, services of greater interest to that community, etc.). In cases where the user/customer does not share the inferred/assumed characteristic, then the recommendation is probably no worse than other less relevant recommendations.

In one embodiment, the invention is directed to a method for generating a recommendation for a product or service to a customer, where the method includes:
  determining one or more of a first name, last name, or zip code of the customer;
  based at least in part on the determined data, determining a probability that the customer has a specific demographic characteristic;
  based at least in part on the determined probability, accessing data regarding one or more products or services expected to be of interest to the customer; and
  generating a recommendation of one of the one or more products or services and presenting it to the customer.

In another embodiment, the invention is directed to a multi-tenant data processing system, where the system includes:
  one or more business related data processing applications installed in the system and accessible by a plurality of tenants of the multi-tenant data processing system;
  a data storage element accessible by a plurality of tenants of the multi-tenant data processing system; and
  a processor programmed with a set of instructions, wherein when executed by the processor, the instructions cause the system to
    determine one or more of a first name, last name, or zip code of a customer;
    based at least in part on the determined data, determine a probability that the customer has a specific demographic characteristic;
    based at least in part on the determined probability, access data regarding one or more products or services expected to be of interest to the customer; and
    generate a recommendation of one of the one or more products or services and presenting it to the customer.

In yet another embodiment, the invention is directed to an apparatus for generating a recommendation for a product or service to a customer, where the apparatus includes:
  an electronic data storage element; and
  a processor programmed with a set of instructions, wherein when executed by the processor, the instructions cause the apparatus to
  determine one or more of a first name, last name, or zip code of a customer based on a single electronic purchase transaction;
  based at least in part on the determined data, determine a probability that the customer has a specific demographic characteristic, wherein the specific demographic characteristic is the customer's ethnicity or ethnic group, and further, wherein the probability that the customer has a specific demographic characteristic is determined at least in part by accessing a secondary source of data different than the source that provided the one or more of a first name, last name, or zip code;
  based at least in part on the determined probability, access data regarding one or more products or services expected to be of interest to the customer; and
  generate a recommendation of at least one of the one or more products or services and present it to the customer, wherein generating the recommendation is based at least in part on use of a collaborative filtering technique, mechanism, or process.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
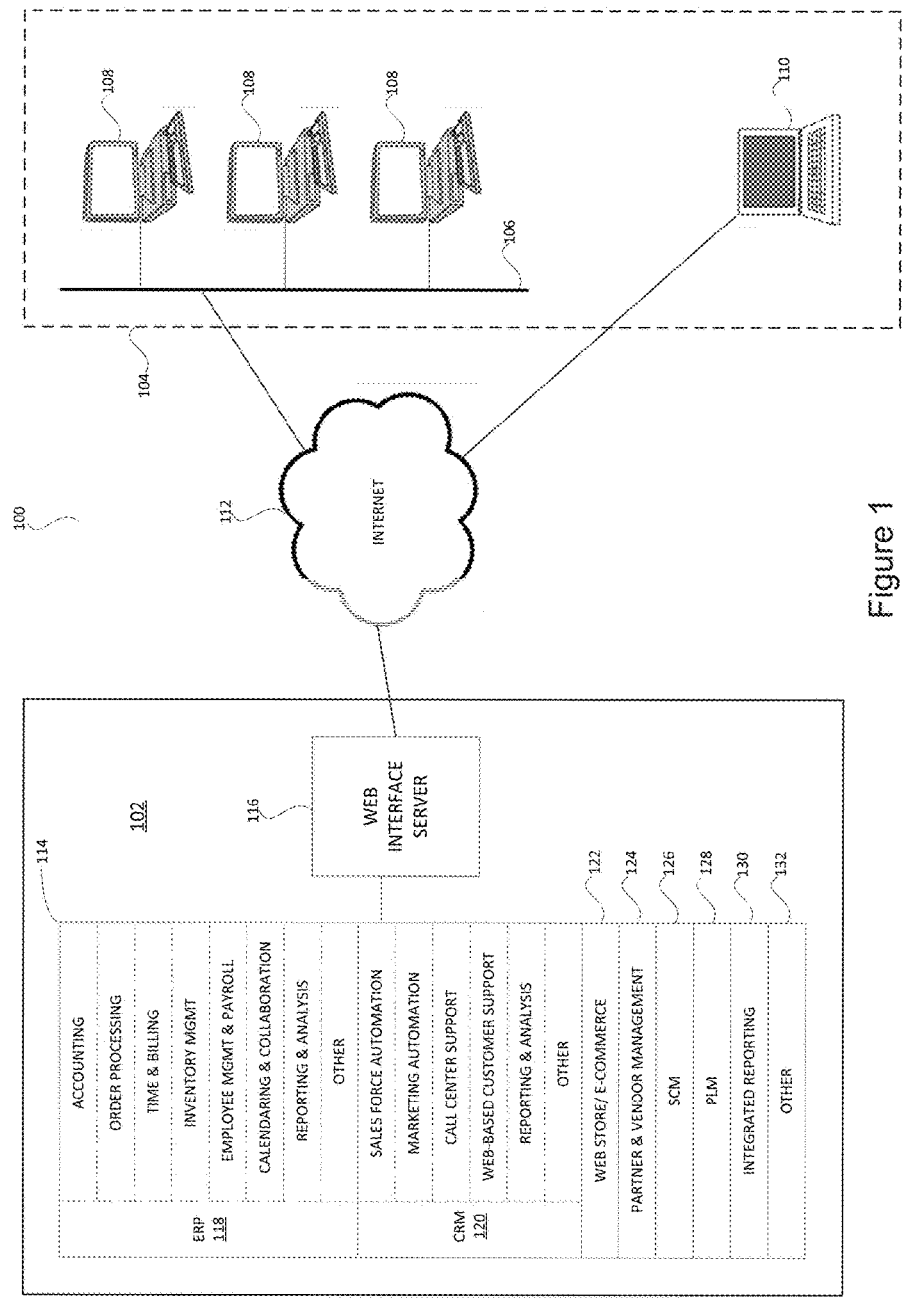
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for determining one or more demographic characteristics of a user/customer, and then using such information to generate a recommendation of a product or service for the user/customer. In some embodiments, information gathered from a single eCommerce transaction (e.g., last name, first name, IP address) may be used to infer or predict the ethnicity or nationality of a customer. Based on that inference or prediction, a method such as collaborative filtering may be used to generate a recommendation of a product or service by considering a set of products or services that are more commonly purchased by, or associated with, members of that ethnicity or nationality.

In one embodiment, the invention may implement a heuristic or model that assumes that a reliable recommendation may be based on a personal characteristic C of a customer (such as age, income, ethnicity, nationality, highest level of education, languages spoken, etc.), because if a set of people having characteristic C tend to buy or be interested in one or more products in the set S, then given someone with C, they may be interested in an item in that set. In a variation, they may be interested in an item that others having C browsed, placed into a shopping cart, or purchased. In another variation, they may be interested in an item typically purchased with the item or items from (S), but that are not in (S). In such cases, collaborative filtering or a machine learning technique may be used to determine how the purchase of one product might be correlated to a likely interest (or sufficient level of interest) in another product.

In some embodiments, the inventive system and methods involve inferring/predicting the ethnicity or nationality of a customer/shopper based on their Name (first, last) and/or the zip code. This data may be obtained from a single purchase using an eCommerce platform (and in some cases, from an in-store purchase if a store branded credit card is used), or from a registration process for a loyalty, product information distribution, warranty, product messaging, or other form of program. One or more ethnic/nationality characteristics are then found using the methods described herein, sometimes with the addition of accessing a supplementary database (e.g., local, state, or Federal United States census data, other country census data, etc.) via APIs or alternatively, one or more relevant database(s) may be maintained by a merchant or user for use in direct data mining tasks.

Note that although both the name-based method and IP address/zip code based methods of determining or inferring a customer's ethnicity/nationality described herein may be used separately, in some cases a more reliable result may be obtained by using both methods, with one acting as a check, verification, or decision tool for accepting the results of the other. Also, in some cases, one or both of the methods may be used to narrow down a set of possible conclusions to a "best" assumption or hypothesis regarding a customer's ethnicity/nationality by providing confirming data or by enabling the selection of a most likely ethnicity/nationality based on probability distributions, etc.

While conventional eCommerce platforms and platform operators utilize the historical purchase data of one or more people to recommend other products, the inventive system and methods enable vendors to recommend products based on the data gathered from a first sales transaction; this is faster and requires less information than conventional transaction-based recommendation methods. If a purchase history is available, then it may be accessed and used to obtain results that are expected to be more accurate, but it is not required to implement some aspects of the invention.

Information regarding certain demographic characteristics of a customer is of value because it can permit a manufacturer or vendor to better plan and execute their marketing/advertising programs by suggesting how best to present and describe a product or service to the most likely purchasers. It thus can be used as one of the inputs to a process that is designed to generate recommendations or suggestions to customers, based at least in part on those demographic characteristics. For example, if the typical purchaser of a product has a certain education, income, or set of cultural beliefs, then an advertising or marketing program that recognizes these characteristics is likely to be more effective since it will be "tuned" to appeal to those characteristics and to not be in contradiction to them.

In some embodiments, the invention may be implemented in the context of a multi-tenant, "cloud" based environment (such as a multi-tenant business data processing platform), typically used to develop and provide web services and business applications for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, another form of client-server architecture, etc. In general, an embodiment of the inventive systems and methods may be implemented in the context of any data processing environment or architecture in which users may engage in browsing, selecting, inquiring about, communicating about, or purchasing products or services (such as a platform hosting an eCommerce site, etc.).

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to supporting one or more software services or applications intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
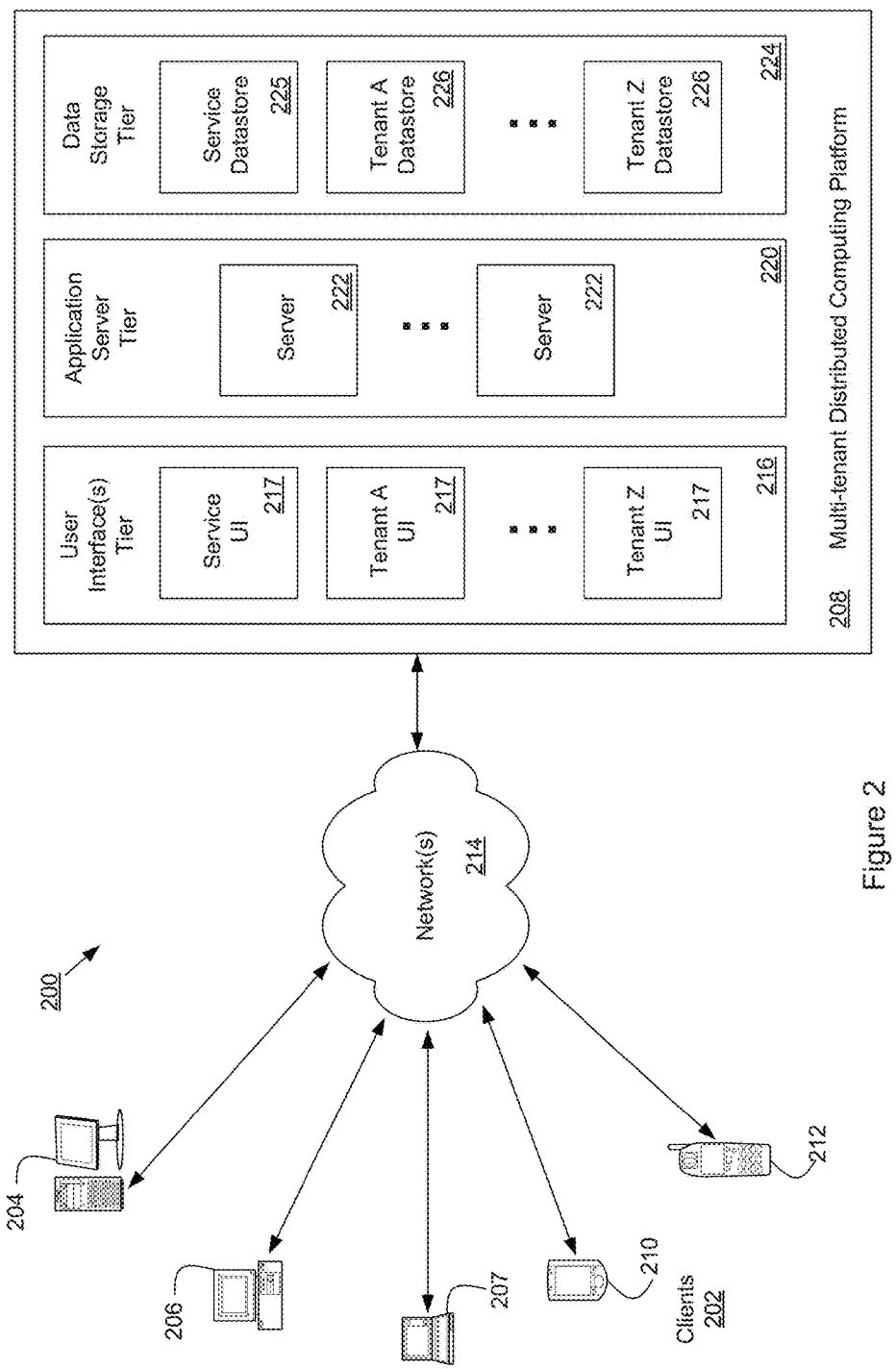
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or system administrator to configure/administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to supporting one or more software services or applications intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases such an extension may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In the context of the present invention(s), such an extension or modification may be one that uses platform-resident data as part of a process to generate a recommendation for a customer/shopper. This data may include eCommerce transaction data, inventory data, profit margin data, customer/shopper name and address or name and general location data, etc. In this example, the extension or recommendation process workflow may be available as a sub-process that is executed by the tenant/account owner or by an administrator of the multi-tenant platform, either separately or as part of another platform-resident data processing application (such as an eCommerce or Marketing application).

Figure 3:
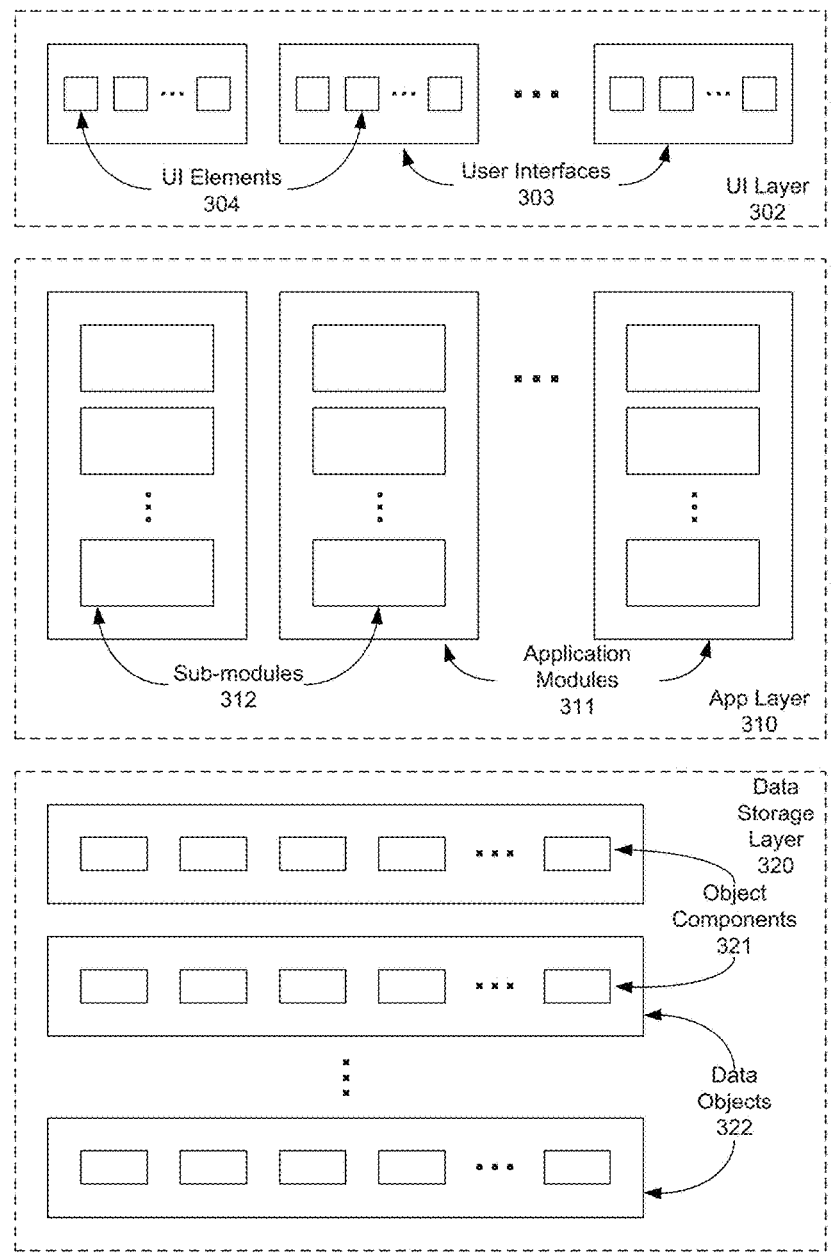
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

Accepting information from a user or a data storage element regarding a user's name and/or shipping or billing address;

Identifying data that can be used to determine the user's geographic location (such as an IP address corresponding to the user's computing/data entry device and/or the zip code corresponding to the shipping or billing address);

Associating the identified data with a specific geographic region or location (such as by determining the zip code or geographic region corresponding to the IP address or extracting zip code information from a user's shipping or billing address, and using the data to specify a location, region, census area, etc., by a mapping or other suitable process);

Based on the specific geographic region, area, or location, obtaining information regarding the probability of the user having a specific demographic characteristic of interest (for example, from census data for that region and/or surrounding regions); and/or Based on the user's first and/or last name(s), obtaining information regarding the probability of the user having a specific ethnicity or nationality (note that other demographic characteristics may also be determined or predicted if relevant data is available);

Using one or more of the probability of the user having a specific demographic characteristic and/or the probability of the user having a specific ethnicity or nationality, determining an estimation or generating an assumption as to the user's ethnicity, nationality, or other demographic characteristic (note that this estimated or hypothetical demographic characteristic may be determined using one or more primary sources of data and, in some cases, one or more secondary, confirming sources of data);

Generating a product or service recommendation for the user based at least in part on the user's ethnicity, nationality or other demographic characteristic—this may involve application of one or more heuristics, filtering methods, or comparisons to a set of products or services typically purchased by those having the specific demographic characteristic, ethnicity, etc.; and Note that such an inference or estimation as to the value of a user's demographic characteristic may also be used to determine a profile or aggregate value of that characteristic for a set of purchasers of a product or service—this will typically be of use in identifying a set of products or services that are expected to be of greater interest to a customer having the demographic characteristic (or to a customer expected to have a sufficiently high likelihood of having that characteristic).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, eCommerce, data review, etc. and which have user interfaces or user interface components that can be configured to present an interface to a user. Although further examples below may reference the example computing environment depicted in FIGS. 1-3, it will be apparent to one of skill in the art that the examples may be adapted for alternate computing devices, systems, apparatuses, processes, data storage devices, and data processing environments. Note that an embodiment of the inventive methods may be implemented in the form of an application, a sub-routine that is part of a larger application, a "plug-in", an extension to the functionality of a data processing system or platform, or any other suitable form.

Figure 4A:
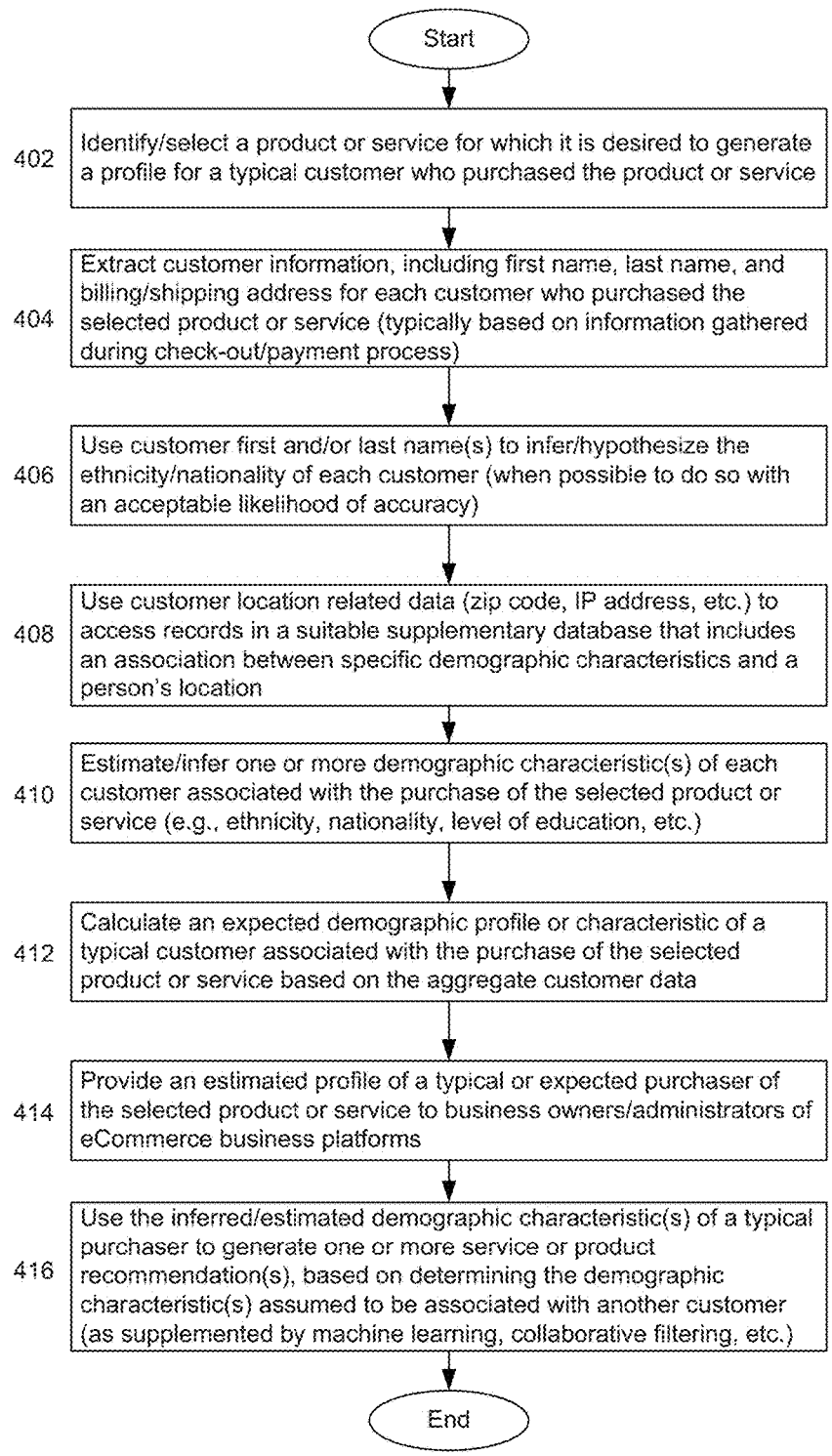
FIG. 4(a) is a flow chart or flow diagram illustrating a process, method, operation, or function for determining the ethnicity, nationality, or other demographic characteristic of a "typical" representative customer that purchased a product or service, and for using that information to generate a product or service recommendation for another customer, and that may be used when implementing an embodiment of the invention.
Figure 4B:
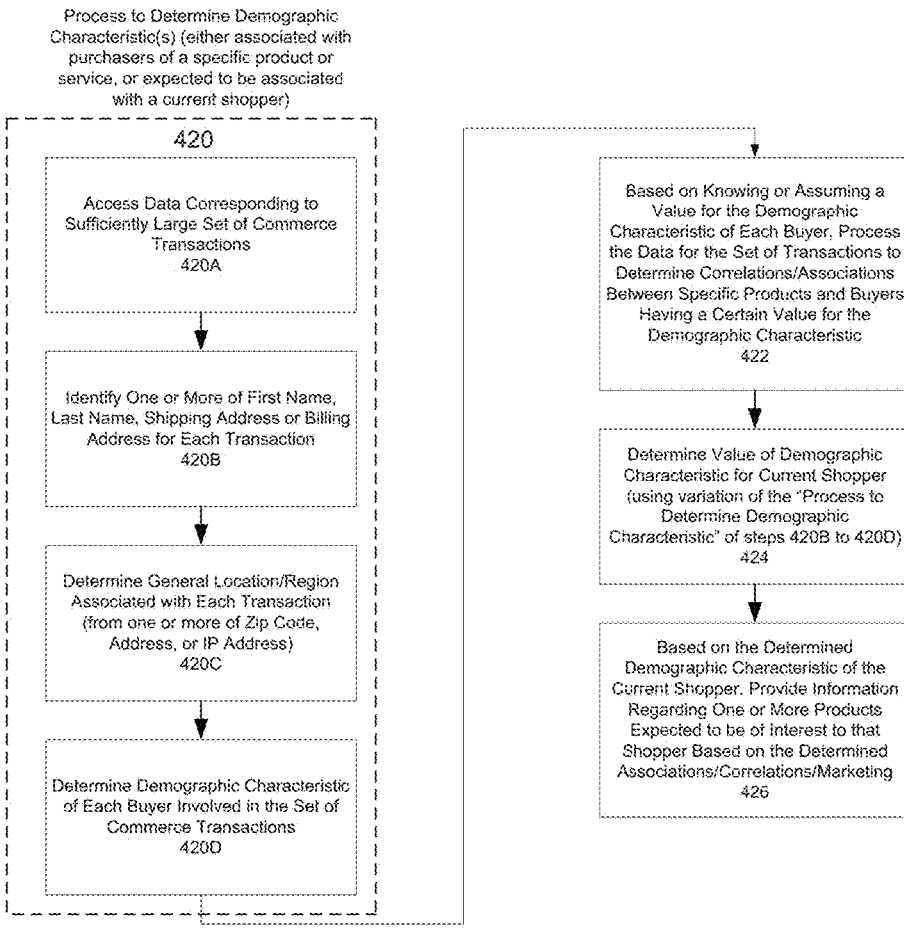
FIG. 4(b) is a flow chart or flow diagram illustrating a process, method, operation, or function for determining the ethnicity, nationality, or other demographic characteristic of a "typical" representative customer that purchased a product or service, and for using that information to generate a product or service recommendation for another customer, and that may be used when implementing an embodiment of the invention.

FIG. 4(*a*) is a flow chart or flow diagram illustrating a process, method, operation, or function for determining the ethnicity, nationality, or other demographic characteristic of a "typical" representative customer that purchased a product or service, and for using that information to generate a product or service recommendation for another customer, and that may be used when implementing an embodiment of the invention. This method or process may be used to construct a profile of a typical or most common purchaser of a specific product or service, where that profile may include one or more of an ethnicity, nationality, or another demographic characteristic that may be determined (or hypothesized) based on information obtained from a registration process or commerce transaction.

More specifically, using one or more of a person's first name, last name, and information that can be used to determine an approximate location, embodiments of the inventive system and methods may use a secondary source of information (such as a census database or other source of compiled demographic information that is associated with name and/or location) to make an educated "guess" regarding the likelihood of the person having a specific ethnicity, nationality, education level, income level, etc. This information may then be used in aggregate to determine the typical, common, or most likely demographic characteristics associated with a purchaser of a specific product or service. As a result, when a customer having the same demographic characteristic or characteristics (as assumed, based on their first name, last name, and location data) is interacting with an eCommerce site, a product or service that is expected to be of interest to them based on that characteristic (such as ethnicity, nationality, education level, household inhabitants, etc.) may be presented or suggested to them.

As shown in the figure, in some embodiments an implementation of the inventive process, method, operation, or function may include the steps or stages of:

Identifying/selecting a product or service for which it is desired to estimate or derive a profile for a typical or representative customer/buyer (step or stage 402);

Determine one or more of a first name, last name, and geographic location/address for each customer/buyer of the specified product or service; typically from information gathered at registration (for a loyalty program, to obtain access to a service, etc.), or at check-out (as part of a billing and/or shipping address), and as shown in step or stage 404;

Using each customer's first name and/or last name, infer the likelihood of each customer belonging to a specific ethnicity/nationality (based on data mining of census data and/or secondary databases containing a mapping between name(s) and nationality, etc.), as shown in step or stage 406;

Using the IP address (to obtain the general physical location) and/or the physical address (from billing or shipping data), access information that provides the percentages of each ethnicity/nationality or other demographic characteristic of interest as a function of the physical location (this may typically be obtained from census data or other compilation of information regarding the demographic characteristics associated with a name and/or location), as shown in step or stage 408;

From the one or more sources of accessed information, determine the likelihood or probability that each customer has a specific ethnicity, nationality, or other demographic characteristic of interest (note that this determination or prediction may be based on the data from the name-based data and/or from the location-based data, with one of the methods being used to confirm or assist in evaluating the accuracy of the other), as shown in step or stage 410;

Based on the likelihood or probability that each customer has a specific ethnicity, nationality, or other demographic characteristic of interest, determine an expected demographic profile or characteristic for an example customer belonging to the set of all customers who purchased the product or service, and for whom data is available (step or stage 412);

Provide the profile of the expected customer who purchased the product or service to business owners or eCommerce platform operators interested in such information (step or stage 414); and Using the estimated profile or demographic characteristic(s), apply one or more of statistical, machine learning, or collaborative filtering methods to generate a product or service to recommend to another customer based on that customer's assumed/predicted demographic characteristics (step or stage 416).

Note that the product or service recommendation for the customer may be the result of application of one or more collaborative filtering based rules or heuristics, such as:

if a set of people having characteristic C (which may be a specific ethnicity or nationality, education level, for example) tend to buy or be interested in one or more products in the set S, then given someone with C (or assumed to have that characteristic), that person may be interested in an item in that set (which may be other than one they purchased or browsed);

In a variation, they may be interested in an item that others having C browsed, placed into a shopping cart, or purchased;

In another variation, they may be interested in an item typically purchased with the item or items from (S), but that are not in (S); and In another variation, if a customer buys an item that is predominantly purchased by customers with the characteristic C (such as a personal care product, food, spice combination, video, book, etc.), then it may be assumed that they are more likely to have that characteristic—based on this, other items found to be of interest to those having C may be of interest to the customer (this may be of use where sufficient information to infer a demographic characteristic of the customer is not available or reliable).

Note that embodiments of the inventive system and methods may be used in conjunction with a known set of products or services that are expected to have greater appeal to persons having a certain common demographic characteristic, where that characteristic (such as nationality, ethnicity, religious preference, etc.) may be assumed/predicted on the basis of a limited set of information about a new customer. This means that once the demographic characteristic is assumed/predicted for a new customer (such as might be made possible by a single commerce transaction), then other products or services may be recommended to them based on the assumed/predicted characteristic.

In this manner, embodiments of the inventive system and methods may generate useful recommendations based on very limited transaction data; this is enabled by reference to other types of data that is typically available outside of the commerce transaction (i.e., ethnicity, nationality, etc., as derived from a mapping of name and/or location to that characteristic). In some instances, a recommendation may be generated contemporaneously with a current transaction based on that single transaction. In some instances, a recommendation may be generated based on a viewing, browsing, or purchasing session that provides the information used as a "key" or index in determining the most likely value for a shopper's particular demographic characteristic.

Note further that embodiments of the inventive system and methods may implement one or more of the following processes or sub-processes as part of generating product or service recommendations:

Determining a (i.e., generating an assumed or likely) demographic characteristic of a current customer based on limited personal information (i.e., one or more of first name, last name, or location as suggested by an IP address or shipping/billing address zip code);

Using that characteristic as an index or "key" into a set of products or services that are expected to appeal (or to have greater appeal) to a person having that characteristic;

note that the set of products or services expected to have appeal may be determined by performing suitable data processing or data mining techniques on data representing transactions performed by a set of people, determining an assumed value of the characteristic for each of those persons (e.g., using the methodology based on one or more of first name, last name, or general location), and then identifying products or services that are preferentially purchased by people having that characteristic (as a result of machine learning, statistical analysis, etc.); or Using that characteristic as the basis for recommending a product or service that is marketed to persons having that characteristic (or is frequently purchased with another product purchased by a person having that characteristic).

Example Use Case and Implementation of an Embodiment of the Inventive System and Methods For purposes of this example (which is similar in some ways to that described with reference to FIG. 4(*a*)), suppose an eCommerce business owner wants to infer/estimate the typical customer characteristic(s) associated with a purchaser of a specific product or service (or for a combination of several products and/or services). This may be done in order to use that information as the basis for generating a recommendation of that product or service to a person having certain characteristics in common with the set of customers/purchasers.

FIG. 4(*b*) is a flow chart or flow diagram illustrating a process, method, operation, or function for determining the ethnicity, nationality, or other demographic characteristic of a "typical" representative customer that purchased a product or service, and for using that information to generate a product or service recommendation for another customer, and that may be used when implementing an embodiment of the invention. As shown in the figure, a process to determine a demographic characteristic (identified as step or stage 420) may be utilized for two purposes: (a) to determine the expected value of the characteristic for each of a set of purchasers of a specific product or service, and from that to determine the most likely or expected value of the characteristic for a purchaser of the product or service; and (b) to determine the expected value of the characteristic for a current customer/shopper.

The process or sub-process (identified as step or stage 420) to determine a demographic characteristic may include the following steps or stages:

420A—for the purpose of determining the most likely or expected value of the characteristic for a purchaser of a specific product or service—access data regarding transactions that involved the purchase of the specific product or service—note that this set should represent a sufficiently large sample of transactions to support the reliability of the determined/inferred value of the characteristic;

420B—for each transaction, identify one or more of the first name, last name, shipping address, and billing address (or IP address if available) of the purchaser that generated the transaction;

420C—based on the identified information, determine the general location or region in which the purchaser resided at the time of the transaction—note this may be obtained from a zip code or IP address in most instances; further, it will generally be desirable to be able to determine the location/region with a resolution sufficient to be used to access demographic data in a database that contains a mapping of location/region to that demographic data; and 420D—based on the data and mapping(s) associated with the available databases, select a suitable source of data (e.g., census, business study, poll, etc.) to enable the determination of the most likely or expected value of the demographic characteristic for each purchaser of the product or service.

Note that as a result of performing steps or stages 420A-420D for each of a sufficiently large set of transactions, the inventive method is able to construct a profile of the expected value(s) of the demographic characteristic(s) associated with a purchaser of the product or service. Further, depending on the data available in the databases, this demographic characteristic may be one or more of ethnicity, nationality, religious preference, highest level of education, median or average household income, etc.

The following is additional information regarding an example implementation of an embodiment of the inventive system and methods. Such information may be used to prepare a set of computer-executable instructions for implementing one or more of the functions, processes, methods, or capabilities of the invention:

Denote by i the numeric index corresponding to the ith customer who purchased a specific product or service. It is assumed that customers are people, and not another entity, such as a company. Denote by $N_i$ a first name of the ith customer, and denote by $L_i$ the last name of the ith customer. Further, denote by $Z_i$ a postal zip code (typically obtained from either a shipping or billing address) provided by the ith customer during a registration or check out/purchase process;

Next, access one or more supplementary databases in order to estimate certain aspects of a customer's demographic profile. One such database contains a large number of human first names, and a corresponding probability that a particular name identifies a male or a female person, and if available, a separate probability that the name is associated with a specific ethnic background or nationality. In some cases, these probabilities may be estimated empirically, obtained from other public sources, or assigned by a person having knowledge in the domain.

Denote this supplementary database as FN, where below is an example of several rows from such a database:

| First name | probability of being male | probability of being female | ethnic background/ prob. |
|---|---|---|---|
| John | 100% | 0% | not available |
| Mark | 100% | 0% | not available |

-continued

| First name | probability of being male | probability of being female | ethnic background/ prob. |
|---|---|---|---|
| Julie | 0% | 100% | not available |
| Alex | 85% | 15% | not available |
| Wei | 100% | 0% | Chinese/Asian -- 100% |
| Roshni | 0% | 100% | Indian/Asian -- 100% |

Another supplementary database that may be used is a database containing a large number of human last names and a corresponding probability that a particular name identifies a male or a female person (if available, since in some languages last names of males and females differ from each other, typically by a few letters), and if available, a separate probability that the name is associated with a specific ethnic background or nationality. As in the previous example, the probabilities may be estimated empirically, obtained from other public sources, or assigned by a person having knowledge in the domain.

Denote this supplementary database as LN, where below is an example of several rows from such a database:

| Last name | prob. of being male | prob. of being female | ethnic background/prob. |
|---|---|---|---|
| Smith | not available | not available | not available |
| Ivanov | 100% | 0% | Eastern European/White - 100% |
| Thompson | not available | not available | not available |
| Ivanova | 0% | 100% | Eastern European/White - 100% |
| Lee | not available | not available | Chinese/Asian -- 100% |
| Gupta | not available | not available | Indian/Asian -- 100% |

Below is an example of the estimation of certain demographic characteristics of one or more customers, based on their names and such supplementary databases (i.e., using in whole or in part the supplementary databases FN and LN):

a) John Smith—male;
b) Mark Ivanov—male, white;
c) Julie Thompson—female;
d) Alex Ivanova—female (because probability of being female corresponding to last name is 100%, which is greater than probability of being male corresponding to first name 85%), white;
e) Wei Lee—male, Asian; and
f) Roshni Gupta—female, Asian.

Note that another way of using the databases FN and LN is for determining the appropriate probability distributions for use in estimating the demographic characteristics of multiple people. For example, assume that 100 different customers have purchased a specific product from an eCommerce web site, and that all of the customers had the first name "Alex" and different last names which have "not available" probability values for the characteristics "probability of being male" and "probability of being female". In such a case, by using database FN, one can assume that 85 people out of those 100 were male, and 15 people were female.

Now assume that an eCommerce web site had N customers who purchased a specific product or service, with corresponding first names and last names $N_i$ and $L_i$, respectively. We can represent each customer's $C_i$ (1=1, 2 . . . N) full name as a combination of ($N_i$, $L_i$). In other words, we can write $C_i$=($N_i$, $L_i$), where (1=1, 2 . . . N). Using the databases FN and LN, an embodiment of the inventive system and methods can generate an estimated aggregate demographic profile for each of the N customers having a name $C_i$ who purchased the specific product from the vendor/web-site.

For that purpose the method may estimate one or more demographic characteristics of each customer $C_i$ by examining/processing the probability values corresponding to $N_i$ in database FN, and the probability values corresponding to $L_i$ in database LN. These one or more demographic characteristics are those that are associated with a first and/or last name in the available supplementary database(s) (e.g., ethnicity, religious preference, nationality, etc.). Next the method operates to aggregate the results/outcomes of such probability mappings and to output an aggregated profile of the set of customers who purchased the specified product or service, i.e., a demographic profile containing one or more characteristics (age range, income range, ethnicity, nationality, etc.) of the "average" or typical purchaser of the product or service.

For example, an aggregated profile of a typical customer might be as follows:
a) 10% of customers are (male, white);
b) 35% of customers are (male, unknown ethnic background);
c) 20% are (females, unknown ethnic background);
d) 20% are (females, Asian); and
e) 15% are (unknown gender, Asian).

Another method of estimating one or more demographic characteristics of a customer or set of customers (and that may be used with, or instead of, the name-based method described) consists of using postal addresses (specifically zip codes) that are provided by customers during a registration or check-out process. In this example, denote $Z_i$ as the zip code (e.g., from a registration, billing, or shipping address) of the ith customer who purchased the product p from the web-site of an eCommerce business. This method may utilize a supplementary database D consisting of postal zip codes and the associated aggregated demographic information for people residing in a specific zip code area or region. For example, this embodiment of the inventive method(s) may use data from publicly available sources, such as the US Census, located at the URL:

http://factfinder.census.gov/faces/nav/jsf/pages/index.xhtml

This source includes a statistical distribution of different demographic characteristics among people residing is a specific zip code area. In particular, the following demographic characteristics may be inferred or estimated based on zip code: annual household income, gender, age, education, and ethnic background (the mean and median values of these demographics characteristics are also available based on zip code).

For example, in one embodiment, the method may estimate the mean value of the income and age of customers who purchased a specific product from a web store. Here denote $I(p)$ as the mean value of household income for all customers who purchased product p, and $I(Z_i)$ as the mean value of household income in zip codes $Z_i$, respectively (i=1, 2, . . . , N). Denote $A(p)$ as the mean value of age for all customers who purchased product p, and $A(Z_i)$ as the mean value of age for people residing in zip code $Z_i$ area. Based on this, it is possible to estimate the following:

$$I(p) = \frac{1}{N}\sum_{i=1}^{N} I(Z_i), \quad A(p) = \frac{1}{N}\sum_{i=1}^{N} A(Z_i)$$

Note that another way of estimating $I(p)$ and $A(p)$ is as follows. Denote $RI(Z_i)$ as the random number generated from a statistical distribution of household income in zip code $Z_i$, as obtained from a database D. Denote $RA(Z_i)$ as the random number generated from a statistical distribution of age in zip code $Z_i$, as obtained from database D. Then, it is possible to estimate:

$$I(p) = \frac{1}{N}\sum_{i=1}^{N} RI(Z_i), \quad A(p) = \frac{1}{N}\sum_{i=1}^{N} RA(Z_i)$$

In a similar fashion, an embodiment of the method may estimate the ethnic profile and/or nationality of customers who purchased the product p. For this purpose, the method generates a random number from the statistical distribution of the ethnic background/nationality of people living in zip code $Z_i$, and selects the corresponding ethnic background/nationality of the person who purchased the product p.

For example, assume that 30% of people residing in zip code $Z_i$ (for some fixed i) have an Asian background, and 70% of people residing in zip code $Z_1$ would be classified as Caucasian/White. The inventive method selects a random number from a set of numbers from 1 to 100, where the first 30 numbers will be tagged/labeled as "Asian", and the last 70 numbers will be tagged/labeled as "White". As a result, the probability of selecting a number having the label 'Asian' would be 30%, while that for 'White' it would be 70%. Next, that process is repeated for all zip codes $Z_i$ (i=1, 2 . . . N) and the results are aggregated for all zip codes $Z_i$ For example, the result of that aggregation might be as follows: "65% of all customers that purchased product p are White, 35% are Asian, and 5% are African American".

Note that other demographic characteristics of customers could be estimated in a similar fashion. In such cases, although a different demographic characteristic might be of interest (e.g., gender, age, income, education level, etc.), similar statistical and/or data mining techniques may be applied (assuming that an appropriate collection of data was available to serve as the basis for the estimation).

Returning to FIG. 4(b), once the ethnicity, nationality or another demographic characteristic of a current shopper/user has been inferred (typically through execution of steps 420B, 420C, and 420D as applied to a single customer), embodiments of the inventive system and methods may use that piece of information as the basis for generating a recommendation for the user. In some embodiments, this recommendation may be based, at least in part, upon having determined a likely value of a certain demographic characteristic that is associated with a set of previous purchasers of a product or service (as suggested by steps 420A, 420B, 420C, and 420D).

For example, given a specified product or service, steps 420A, 420B, 420C, and 420D may enable an embodiment of the inventive system and methods to identify a value of a specific demographic characteristic that is most likely to be associated with a buyer of the product or service (and in some cases, a probability of that being the buyer's value of that demographic characteristic). Next, using a suitable data processing technique (such as machine learning, statistical analysis, pattern matching, etc.), the inventive system and methods may determine one or more correlations or associations between people having certain demographic characteristics (or a certain likelihood of having that demographic characteristic) and one or more products or services that they browse, place into a shopping cart, or purchase, as suggested by stage or step 422 in FIG. 4(*b*).

Once an embodiment of the inventive system and methods determines the expected or most likely value of a demographic characteristic of the current shopper (as suggested by step or stage 424), it may access its previously computed and stored data relating certain demographic characteristics, and certain values or ranges of values of those characteristics, to identify one or more products or services that may be of interest to the current shopper (or at least would be expected to be of greater interest to that shopper), as suggested by stage or step 426.

The recommendation may be based on or supplemented by one or more of the following techniques, either utilized at the time of generating the recommendation or used previously to analyze data available at that time:
  Machine learning (supervised or unsupervised);
  Collaborative filtering—typically, expressed as an underlying theory of why one customer's interest in a product might indicate their likely interest (or more likely interest) in another product. Examples of such processes include, but are not limited to, those based on of the following types of information or data regarding a customer:
    Based on pairs or combinations of products typically being purchased together;
    Based on a demographic characteristic or combination of characteristics of the consumer;
      followed by identifying a product purchased by another customer having that demographic characteristic (which is assumed or has been found by data mining/machine learning to be sufficiently relevant to a decision to purchase the product);
      for example, data indicating that people having the characteristic(s) are likely to purchase an item at a disproportional amount compared to other potential purchasers;
    Based on membership (formal or informal) in a group or set of customers, and data suggesting that the group or set of customers (or potential customers) purchases an item at a disproportional amount compared to other customers or potential customers (i.e., proportionally higher or lower, where each may suggest an opportunity to generate a recommendation or market a product);
  Statistical analysis (e.g., setting parameters in a mathematical model or decision process using the results of performing one or more statistical operations on the raw data); or
  Pattern Matching (e.g., "looking" for combinations of data values and/or types of data that are strongly correlated with purchase of a specific product or products).

Example Process for Generating a Product or Service Recommendation Using an Embodiment of the Inventive System and Methods Assume that an eCommerce company is selling a set of products $p_i$ (1=1, 2 . . . n). The eCommerce company is assumed to have access to information/data sufficient to link each product $p_i$ with a specific demographic characteristic or profile, either by collecting and analyzing data from its own transactions or a history of product sales/customer surveys, or by acquiring such information from an external source.

For example, one instance of a product $p_i$ could be "a specific spice used in food", and which is linked to the following demographic profiles:
  a) 95% of buyers of $p_i$="a specific spice used in food" are "Asian ethnic profile" customers; and
  b) 5% of buyers of $p_i$="a specific spice used in food" are "other than Asian" demographic profile customers.

Now assume that the eCommerce company has sold a product $p_j$="sports shoes" to a customer whose demographic profile would be estimated by using one of the inventive methods as "Asian, female" with a 90% probability of that characterization being accurate (such as based on zip code and name).

Note that in the absence of this inference (or hypothesis) regarding the customer being "Asian, female", it would be very difficult to link together a potential interest in the two products, $p_i$="a specific spice used in food" and $p_j$="sports shoes". But, by using one or more of the inventive methods, a vendor or platform operator could use a collaborative filtering strategy to generate a recommendation that the shoe buying customer purchase (or at least look at) the product $p_i$="a specific spice used in food", because the shoe buying customer has a 90% probability of being "Asian" profile, and 95% of buyers of $p_i$="a specific spice used in food" are "Asian ethnic profile" customers.

Example Process for Optimizing Resource Allocation within a Marketing/Advertising Campaign Using an Embodiment of the Inventive System and Methods Assume that an eCommerce company is selling a set of products $p_i$ (i=1, 2 . . . n). Further, assume that for each product $p_i$, the eCommerce company has allocated a certain amount from its marketing/advertising budget to support that product. Such a budget is often allocated or spent based on the assumption of certain demographic profiles for the customers of the product $p_i$ or for the recipients of the marketing/advertising (e.g., as demonstrated by how funds are allocated to specific communications channels, mediums, events, campaigns, etc.). As expected, it is therefore important for a company to have a well-founded understanding/perception of the main demographic characteristics of customers buying their product $p_i$. Otherwise, the company may inefficiently spend marketing/advertising resources on methods and campaigns that are not properly constructed or directed to the most likely purchasers of the product.

For example, assume that the product/service $p_i$="vacation packages to Europe" which is sold online, and the perception of the company is that 80% of their customers are "people older than 60 years old", 19% of their customers are "people between 35 years old and 60 years old", and 1% of the customers are "people younger than 35 years old". According to this perception, the company may allocate its advertising budget as follows: 80% of budget is being spent towards media/magazines targeting seniors, 19% of budget is being spent targeting professionals 35-60 years old, and 1% of the budget is spent targeting media and local sites linked to young people (under 35 years old).

Now assume that using one or more of the inventive methods, it is determined that 30% of the purchases of product $p_i$="vacation packages to Europe" had a billing address zip code (or zip codes) associated with the location of a college campus (or campuses), and that the average age for the population residing in those zip codes was between 22 to 26 years old. Therefore, it might be concluded that approximately 30% of the customers are actually falling into the category "people younger than 35 years old". This information/prediction could be extremely beneficial to the company; they may conclude that they are spending just 1% of their advertising budget to target the category "people younger than 35 years old", but this results in 30% of customers being "people younger than 35 years old". This means that the company should invest more advertising money to communicate with "people younger than 35 years old", because this investment appears to be extremely effective at generating sales.

Example Process for Understanding/Segmenting Customer Behavior Using an Embodiment of the Inventive System and Methods Embodiments of the inventive methods may also be used to process other types of data/information/behavior which a company tracks as a result of interactions with its customers. For example, customers might be asked to register on the company's web-site and provide their email address in order to make a purchase. In this case, the company would be able to assemble a database of customers' email addresses, and might from time to time send marketing or advertising information concerning products, services, surveys, etc. to those email addresses (typically with an enclosed link to a web page). The company might be interested in determining what characteristics represent the most "typical" demographic profile of a person who activated the link for purposes of follow-up contacts, promotional offers, etc. In this situation, an embodiment of the inventive methods could be used to generate a "prediction" of the applicable demographic profile or characteristics of a number of customers. By then associating this demographic profile to the customer's e-mail address, the company would obtain a better understanding of the typical demographic profile of a person who activated the link.

In some embodiments, the inventive system and methods involve inferring/predicting the ethnicity of a customer/shopper based on their Name (first, last) and the zip code. This data may be obtained from a single purchase using an eCommerce platform (and in some cases, from an in-store purchase if a store branded credit card is used), or from a registration process for a loyalty, product information distribution, product messaging, or other form of program. One or more ethnic characteristics are then found using the methods described herein, sometimes with the addition of accessing a supplementary database (e.g., US or other country census data) via APIs or alternatively, the data base(s) may be purchased for use in direct data mining tasks. Note that although both the name-based method and zip code based method of determining or inferring a customer's ethnicity may be used separately, in some cases a more reliable result may be obtained by using both methods, with one acting as a check or verification of the results of the other. Also, in some cases, one or both of the methods may be used to narrow down a set of possible conclusions to a "best" assumption or hypothesis regarding a customer's ethnicity by providing confirming data or by enabling the selection of a most likely ethnicity based on probability distributions, etc.

Note that while conventional eCommerce platforms and platform operators utilize the historical purchase data of one or more people to recommend other products, the inventive system and methods enable vendors to recommend products based on the very first sale transaction, so that little purchase history required. If a purchase history exists, it may be leveraged but it is not required.

As noted, in some embodiments, the inventive system and methods assume that a reliable recommendation may be based on an ethnic or demographic characteristic because if a set of people having characteristic C tend to buy or be interested in one or more products in the set S, then given someone with C, they may be interested in another item in that set. Or, they may be interested in an item that others having C browsed, placed into a shopping cart, or purchased. Or, they may be interested in an item typically purchased with the item or items from (S), but that are not in (S). Based on such a heuristic, collaborative filtering or machine learning may be used to determine how one product might allow inference of interest in another product.

In some embodiments, one or more of the described methods or inference techniques may be used alone or in combination to generate a recommendation. For example:
1. Given: Last Name, First Name, IP Address (or zip code from user's shipping or billing address)
    a) Determine Zip Code from IP Address (or directly from user's shipping or billing address)
    b) Using census or other data, determine probability of Last Name, First Name being associated with specific gender and ethnicity
    c) Infer ethnicity from database analysis of names/ethnicity data and/or in combination with ethnicity inferred from location based database (such as US Census); and
    d) Generate recommendation based on one of the above heuristics.
2. Based on First Name and/or Last Name obtained from single transaction—using secondary data base(s)
    a. If probability of customer having a specific characteristic exceeds threshold, then assume correct
    b. Access set of products or services browsed, placed into shopping cart and/or purchased by persons with same ethnicity or nationality (and if desired after removing products likely to be purchased independent of ethnicity or nationality)
    c. Using collaborative filtering or statistical analysis, generate recommendation based on one or more of (i) products typically purchased together by members of group to which customer belongs, (ii) product purchased by approximately same % of members of customer's group as purchased the product purchased by customer, (iii) product purchased by member of group that also purchased the product purchased by the customer, (iiii) product being advertised to members of the group, etc.; and
    d. If probability from (a) does not exceed threshold, then use another method, either separately or in combination with (1) as a means for selecting most likely choice among multiple choices.
3. Based on inferred location and/or First Name and/or Last Name obtained from single transaction
    a. Obtain IP Address
    b. Determine likely geographical location or region, or identify zip code directly from shipping or billing address of a user
    c. Access census data to determine ethnicity or nationality proportions residing in likely geographical location or region
    d. Based on census data, infer desired demographic characteristic—if probability of being correct (based purely on statistics in location or region) insufficient to rely upon, utilize method (1) in combination to narrow down to more reliable inference (i.e., one with a higher likelihood of being correct); and e. Apply steps 1(b) and 1(c) above.

Note that many conventional approaches to generating a product or service recommendation may be differentiated or distinguished from the inventive system and methods because those approaches are used with mobile devices having integrated positioning technologies (GPS, network triangulation, etc.) that serve as a source of information source or triggering mechanism. And as noted, another conventional approach is based on associating an IP address with a general location, with that general location then being linked to an aggregated demographic profile. However, as noted, this approach lacks a desired degree of granularity and the accuracy is often poor.

Figure 5:
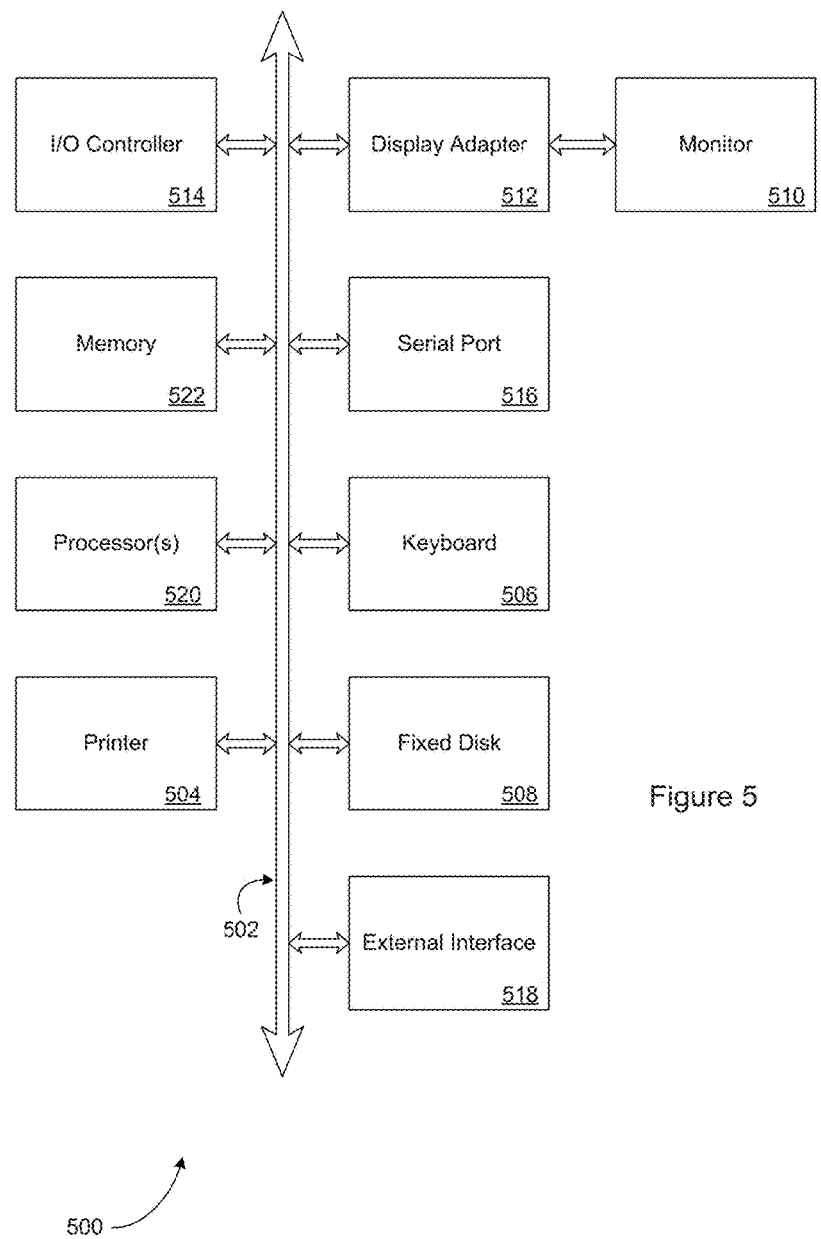
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for generating a product or service recommendation based on an inferred or estimated demographic characteristic may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A computer-implemented method for generating a recommendation for a product or service to a customer, comprising:
   determining one or more of a first name, a last name, or a zip code of the customer in response to a customer interaction with a graphical user interface associated with a product or service recommendation tool, wherein the product or service recommendation tool is associated with a computer application running on a computing device comprising a processor for executing instructions from a memory;
   based at least in part on the determined data, determining by the processor a probability that the customer has a specific demographic characteristic, wherein the probability that the customer has a specific demographic characteristic is determined at least in part by accessing census data that provides information regarding an ethnicity or ethnic group of a person based on one or more of their first name, last name or zip code;
   based at least in part on the determined probability, accessing a database by the processor and retrieving by the processor data regarding one or more products or services expected to be of interest to the customer; and generating by the processor accessing the database a recommendation of one of the one or more products or services and presenting the recommendation to the customer via the graphical user interface associated with the product or service recommendation tool.

2. The computer-implemented method of claim 1, wherein the one or more of a first name, a last name, or a zip code is determined from a single transaction with the customer.

3. The computer-implemented method of claim 2, wherein the single transaction is an electronic purchase of a product or service.

4. The computer-implemented method of claim 2, wherein the single transaction is a registration for a loyalty group or marketing information.

5. The computer-implemented method of claim 1, wherein the specific demographic characteristic is the customer's ethnicity or ethnic group.

6. The computer-implemented method of claim 1, wherein the specific demographic characteristic is one or more of the customer's nationality, religion, level of highest education, or income range.

7. The computer-implemented method of claim 1, wherein accessing a database by the processor and retrieving by the processor data regarding one or more products or services expected to be of interest to the customer further comprises:
- accessing the database by the processor and retrieving by the processor data for a plurality of purchase transactions, the retrieved data indicating a product or products purchased in each transaction and an expected value of one or more demographic characteristics associated with the purchaser who purchased the product or products in the transaction;
- determining by the processor accessing the database an expected value of one of the one or more demographic characteristics of the purchaser, wherein the one of the one or more demographic characteristics is the same characteristic as has been determined for the customer;
- determining by the processor accessing the database a measure of a correlation between the purchase of each of the products purchased by the purchaser and the expected value of the one of the one or more demographic characteristics; and
- if the measure of the correlation is sufficient, then recommending by the processor accessing the database one or more of the products purchased by the purchaser to the customer via the graphical user interface associated with the product or service recommendation tool.

8. The computer-implemented method of claim 1, wherein generating by the processor accessing the database a recommendation of one of the one or more products or services and presenting the recommendation to the customer via the graphical user interface associated with the product or service recommendation tool is based at least in part on use of a collaborative filtering technique, mechanism, or process.

9. A multi-tenant data processing system, comprising:
- one or more business related data processing applications installed in the system and accessible by a plurality of tenants of the multi-tenant data processing system;
- a data storage element accessible by a plurality of tenants of the multi-tenant data processing system; and
- a processor for executing a set of instructions from the data storage element, wherein when executed by the processor, the instructions cause the processor to:
  - determine one or more of a first name, a last name, or a zip code of a customer in response to a customer interaction with a graphical user interface associated with a product or service recommendation tool, wherein the product or service recommendation tool is associated with a computer application running on a computing device comprising the processor;
  - based at least in part on the determined data, determine by the processor a probability that the customer has a specific demographic characteristic, wherein the probability that the customer has a specific demographic characteristic is determined at least in part by accessing census data that provides information regarding the ethnicity or ethnic group of a person based on one or more of their first name, last name or zip code;
  - based at least in part on the determined probability, access a database by the processor and retrieving by the processor data regarding one or more products or services expected to be of interest to the customer; and
  - generate by the processor accessing the database a recommendation of one of the one or more products or services and presenting the recommendation to the customer via the graphical user interface associated with the product or service recommendation tool.

10. The multi-tenant data processing system of claim 9, wherein the business related data processing applications installed in the system include one or more of an enterprise resource planning (ERP), customer relationship management (CRM) or eCommerce application.

11. The multi-tenant data processing system of claim 9, wherein the one or more of a first name, a last name, or a zip code is determined from a single transaction with the customer.

12. The multi-tenant data processing system of claim 11, wherein the single transaction is an electronic purchase of a product or service.

13. The multi-tenant data processing system of claim 11, wherein the single transaction is a registration for a loyalty group or marketing information.

14. The multi-tenant data processing system of claim 9, wherein the specific demographic characteristic is the customer's ethnicity or ethnic group.

15. The multi-tenant data processing system of claim 9, wherein the specific demographic characteristic is one or more of the customer's nationality, religion, level of highest education, or income range.

16. An apparatus for generating a recommendation for a product or service to a customer, comprising:
- an electronic data storage element; and
- a processor for executing a set of instructions from the electronic data storage element, wherein when executed by the processor, the instructions cause the apparatus processor to:
  - determine one or more of a first name, a last name, or a zip code of a customer based on a single electronic purchase transaction in response to a customer interaction with a graphical user interface associated with a product or service recommendation tool, wherein the product or service recommendation tool is associated with a computer application running on a computing device comprising the processor;

based at least in part on the determined data, determine by the processor a probability that the customer has a specific demographic characteristic, wherein the specific demographic characteristic is the customer's ethnicity or ethnic group, and further, wherein the probability that the customer has a specific demographic characteristic is determined at least in part by accessing by the processor census data that provides information regarding the ethnicity or ethnic group of a person based on one or more of their first name, last name or zip code;

based at least in part on the determined probability, access a database by the processor and retrieving data regarding one or more products or services expected to be of interest to the customer; and generate by the processor accessing the database a recommendation of at least one of the one or more products or services and present the recommendation to the customer via the graphical user interface associated with the product or service recommendation tool, wherein generating the recommendation is based at least in part on use of a collaborative filtering technique, mechanism, or process.

\* \* \* \* \*